United States Patent [19]
Fisher

[11] Patent Number: 6,012,758
[45] Date of Patent: Jan. 11, 2000

[54] ADJUSTABLE SUN VISOR EXTENSION DEVICE

[76] Inventor: Evelyn Fisher, 392 A. Bainbridge St., Brooklyn, N.Y. 11233

[21] Appl. No.: 09/220,042
[22] Filed: Dec. 23, 1998
[51] Int. Cl.[7] .......................................................... B60J 3/02
[52] U.S. Cl. ......................................... 296/97.6; 296/97.8
[58] Field of Search ................................ 296/97.6, 97.8, 296/97.9; 160/DIG. 3

[56] References Cited

U.S. PATENT DOCUMENTS

| | | | |
|---|---|---|---|
| 3,948,554 | 4/1976 | Barbee | 296/97.6 |
| 3,954,297 | 5/1976 | Linke et al. | 296/97.6 |
| 4,023,855 | 5/1977 | Janata et al. | 296/97.6 |
| 4,861,091 | 8/1989 | Wallen | 296/97.6 |
| 4,982,992 | 1/1991 | Vu | 296/97.6 |
| 5,044,685 | 9/1991 | Yang | 296/97.6 |
| 5,356,192 | 10/1994 | Schierau | 296/97.6 |
| 5,427,427 | 6/1995 | Holter | 296/97.6 |
| 5,470,122 | 11/1995 | Feng | 296/97.6 |
| 5,611,591 | 3/1997 | Van Devender | 296/97.6 |
| 5,613,725 | 3/1997 | Lozano | 296/97.6 |
| 5,829,816 | 11/1998 | Cimmino | 296/97.6 |

Primary Examiner—D. Glenn Dayoan
Assistant Examiner—Jason Morrow
Attorney, Agent, or Firm—Goldstein & Canino

[57] ABSTRACT

An adjustable sun visor extension device including a bracket is securable to a rear surface of a sun visor. The bracket has a generally U-shaped configuration defined by a lower horizontal portion and a pair of vertical portions extending upwardly from opposed ends of the horizontal portion. The lower horizontal portion is positionable on a lower portion of the rear surface of the sun visor. The pair of vertical portions each have free upper ends extending over an upper edge of the sun visor to a position on an upper portion of a front surface of the sun visor. An extension portion is pivotally coupled with respect to the bracket. The extension portion has a generally rectangular configuration defined by an upper edge, a lower edge, opposed side edges, a front surface, and a back surface. The rear surface of the extension portion has an upper tab extending upwardly therefrom above the upper edge thereof. The upper tab adjustably coupling with the lower horizontal portion of the bracket. The rear surface of the extension portion has a pair of lower tabs extending downwardly therefrom below the lower edge thereof. The pair of lower tabs each engage the free upper ends of the vertical portions of the bracket in a closed orientation.

4 Claims, 2 Drawing Sheets

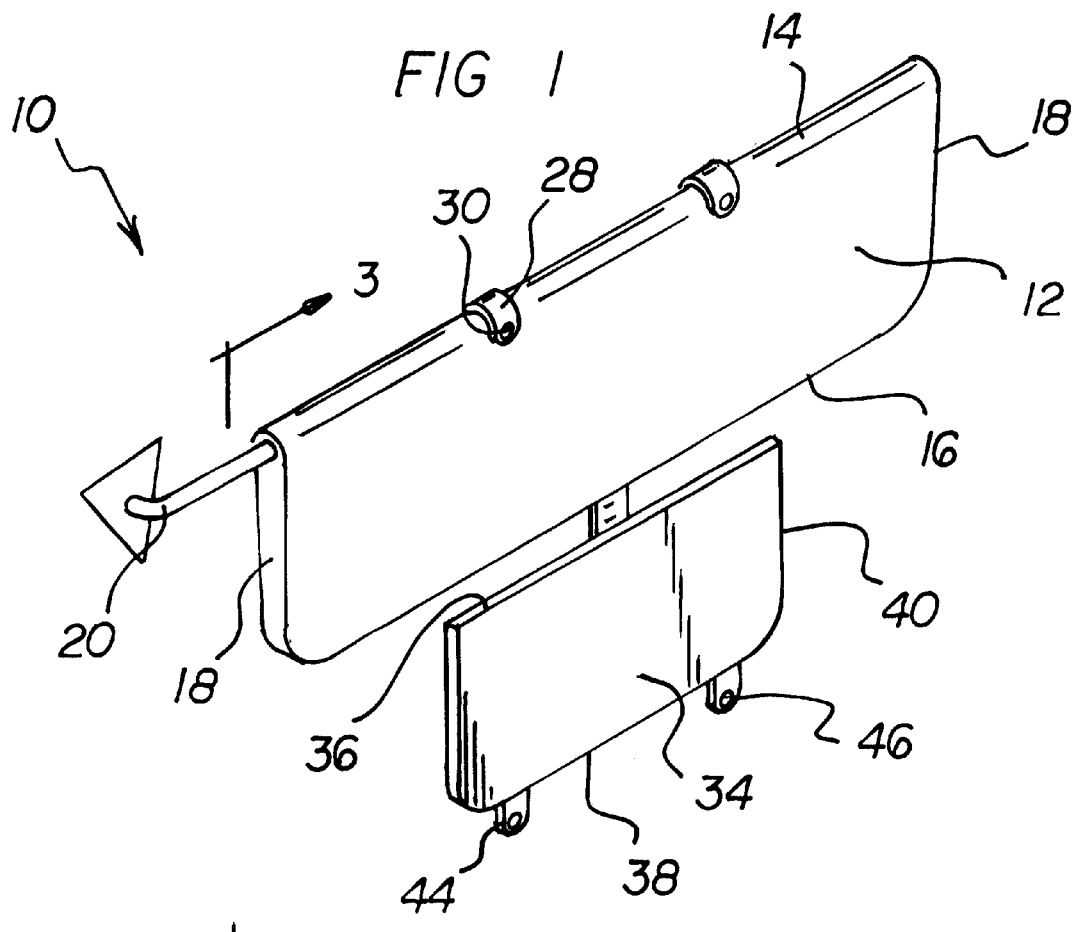
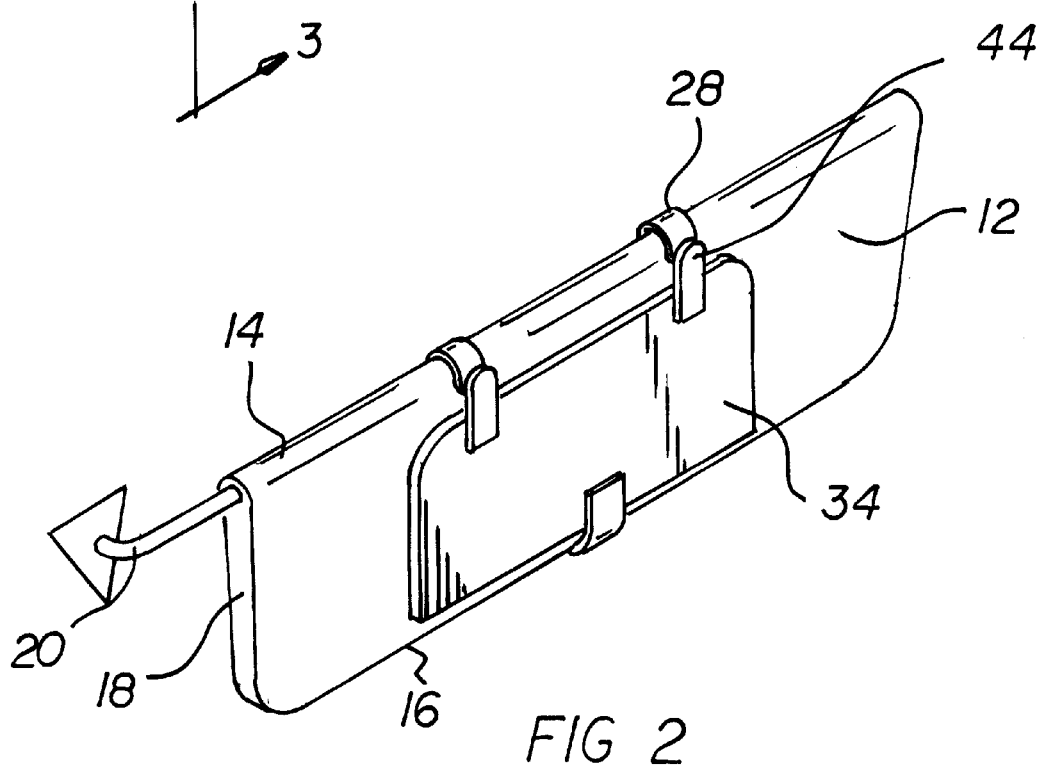

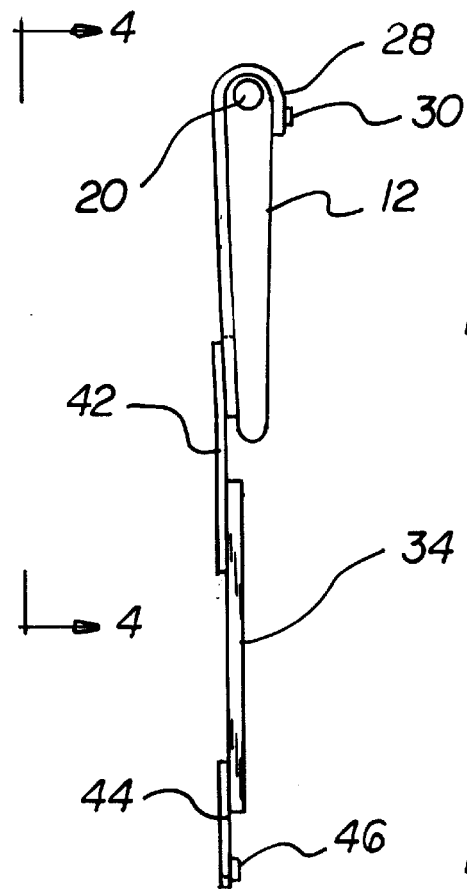
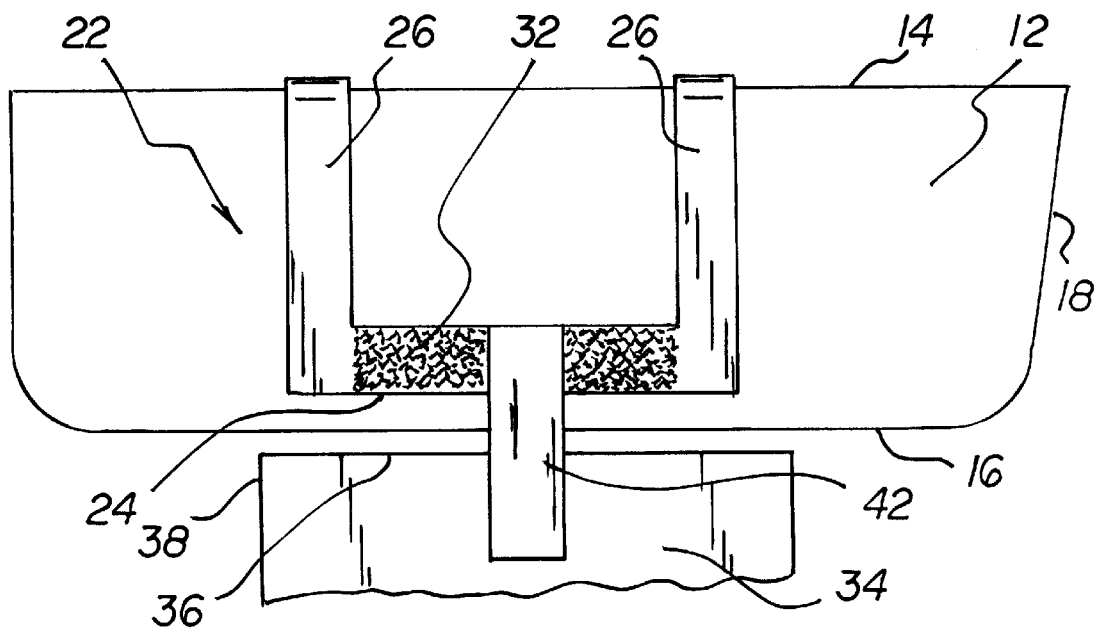

ADJUSTABLE SUN VISOR EXTENSION DEVICE

BACKGROUND OF THE INVENTION

The present invention relates to an adjustable sun visor extension device and more particularly pertains to screening light from a person's eyes while in a vehicle and adjusting to their specific need.

When driving or riding in the front seat of an automobile, the driver and passenger often encounter numerous situations in which their view's are subjected to glaring sunlight impinging upon their eyes directly from the sun or from objects reflecting the sun's rays into their faces. Such glaring light may be, in the least situation, annoying to the driver and the passenger; and, in the worse situation, may even cause temporary blinding to the driver's view of the road, thus possibly causing an accident. Drivers and passengers often attempt to overcome this problem by wearing sunglasses, but the sunglasses often impede the driver's ability to see when not confronted directly by the sunlight. The above problems have attempted to be overcome by the use of glare shields mounted to the sun visor of the vehicle. The glare shield is normally located in a storage position behind the sun visor, and in a glaring light situation it may be swung to a position below the sun visor so as to screen the annoying glaring sunlight shining directly onto the driver's face.

Many of the aforementioned glare shields do not allow for the driver or passenger to adjust the positioning of the glare shield with respect to the sun visor. This sometimes limits the use of the glare shields to one particular area, usually straight ahead, to block the glaring light. The present invention attempts to solve this problem by providing an extension device that can be moved laterally with respect to the sun visor thereby affording greater protection.

The use of light screening devices is known in the prior art. More specifically, light screening devices heretofore devised and utilized for the purpose of screening light from a person's eyes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,044,665 to Yang discloses a sun visor extension system attached by magnets or hook and loop fasteners. U.S. Pat. No. 4,861,091 to Wallen discloses a glare reducing system with an adjustable visor, utilizing a tongue and groove mechanism. U.S. Pat. No. 4,982,992 to Vu discloses a sun visor that is attached by a clip. U.S. Pat. Nos. 5,470,122 and 5,356,192 to Schieraur disclose additional visor extensions.

While these devices fulfill their respective, particular objective and requirements, the aforementioned patents do not describe an adjustable sun visor extension device for screening light from a person's eyes while in a vehicle and adjusting to their specific need.

In this respect, the adjustable sun visor extension device according to the present invention substantially departs from the conventional concepts and designs of the prior art, and in doing so provides an apparatus primarily developed for the purpose of screening light from a person's eyes while in a vehicle and adjusting to their specific need.

Therefore, it can be appreciated that there exists a continuing need for new and improved adjustable sun visor extension device which can be used for screening light from a person's eyes while in a vehicle and adjusting to their specific need. In this regard, the present invention substantially fulfills this need.

SUMMARY OF THE INVENTION

In the view of the foregoing disadvantages inherent in the known types of light screening devices now present in the prior art, the present invention provides an improved adjustable sun visor extension device. As such, the general purpose of the present invention, which will be described subsequently in greater detail, is to provide a new and improved adjustable sun visor extension device and method which has all the advantages of the prior art and none of the disadvantages.

To attain this, the present invention essentially comprises a sun visor portion having a generally rectangular configuration. The sun visor portion is defined by an upper edge, a lower edge, a pair of opposed side edges, a front surface, and a rear surface. One of the opposed side edges has a pivot rod extending outwardly of an upper end thereof for pivotally coupling with an interior of a vehicle above a windshield thereof. A bracket is secured to the rear surface of the sun visor portion. The bracket has a generally U-shaped configuration defined by a lower horizontal portion and a pair of vertical portions extending upwardly from opposed ends of the horizontal portion. The lower horizontal portion is positioned on a lower portion of the rear surface of the sun visor. The pair of vertical portions each have free upper ends extending over the upper edge of the sun visor to a position on an upper portion of the front surface. The free upper ends each have a male snap fastener disposed thereon. The lower horizontal portion has hook and loop material disposed thereon. An extension portion is pivotally coupled with respect to the bracket. The extension portion has a generally rectangular configuration defined by an upper edge, a lower edge, opposed side edges, a front surface, and a back surface. The rear surface of the extension portion has an upper tab extending upwardly therefrom above the upper edge thereof. The upper tab has hook and loop material disposed on an outer surface thereof for mating with the hook and loop material of the lower horizontal portion of the bracket. The rear surface of the extension portion has a pair of lower tabs extending downwardly therefrom below the lower edge thereof. The pair of lower tabs each have a female snap fastener disposed thereon for engaging the male snap fasteners of the free upper ends of the vertical portions of the bracket in a closed orientation.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable sun visor extension device which has all the advantages of the prior art light screening devices and none of the disadvantages.

It is another object of the present invention to provide a new and improved adjustable sun visor extension device which may be easily and efficiently manufactured and marketed.

It is a further object of the present invention to provide a new and improved adjustable sun visor extension device which is of durable and reliable construction.

An even further object of the present invention is to provide a new and improved adjustable sun visor extension device which is susceptible of a low cost of manufacture with regard to both materials and labor, and which accordingly is then susceptible of low prices of sale to the consuming public, thereby making such an adjustable sun visor extension device economically available to the buying public.

Even still another object of the present invention is to provide a new and improved adjustable sun visor extension device for screening light from a person's eyes while in a vehicle and adjusting to their specific need.

Lastly, it is an object of the present invention to provide a new and improved adjustable sun visor extension device including a bracket is securable to a rear surface of a sun visor. The bracket has a generally U-shaped configuration defined by a lower horizontal portion and a pair of vertical portions extending upwardly from opposed ends of the horizontal portion. The lower horizontal portion is positionable on a lower portion of the rear surface of the sun visor. The pair of vertical portions each have free upper ends extending over an upper edge of the sun visor to a position on an upper portion of a front surface of the sun visor. An extension portion is pivotally coupled with respect to the bracket. The extension portion has a generally rectangular configuration defined by an upper edge, a lower edge, opposed side edges, a front surface, and a back surface. The rear surface of the extension portion has an upper tab extending upwardly therefrom above the upper edge thereof. The upper tab adjustably coupling with the lower horizontal portion of the bracket. The rear surface of the extension portion has a pair of lower tabs extending downwardly therefrom below the lower edge thereof. The pair of lower tabs each engage the free upper ends of the vertical portions of the bracket in a closed orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the adjustable sun visor extension device constructed in accordance with the principles of the present invention.

FIG. 2 is a perspective view of the present invention illustrated in a closed orientation.

FIG. 3 is a side view of the present invention as taken along line 3—3 of FIG. 1.

FIG. 4 is a rear view of the present invention as taken along line 4—4 of FIG. 3.

The same reference numerals refer to the same parts through the various figures.

DESCRIPTION OF THE PREFERRED EMBODIMENT

With reference now to the drawings, and in particular, to FIGS. 1 through 4 thereof, the preferred embodiment of the new and improved adjustable sun visor extension device embodying the principles and concepts of the present invention and generally designated by the reference number 10 will be described.

Specifically, it will be noted in the various Figures that the device relates to a adjustable sun visor extension device for screening light from a person's eyes while in a vehicle and adjusting to their specific need. In its broadest context, the device consists of a sun visor portion, a bracket, and an extension portion. Such components are individually configured and correlated with respect to each other so as to attain the desired objective.

The sun visor portion 12 has a generally rectangular configuration. The sun visor portion 12 is defined by an upper edge 14, a lower edge 16, a pair of opposed side edges 18, a front surface, and a rear surface. One of the opposed side edges 18 has a pivot rod 20 extending outwardly of an upper end thereof for pivotally coupling with an interior of a vehicle above a windshield thereof. The positioning of the sun visor portion 12 is standard with respect to the positioning on standard vehicles. The sun visor portion 12 can be secured on a driver's side, a passenger's side, or on both.

The bracket 22 is secured to the rear surface of the sun visor portion 12. The bracket 22 has a generally U-shaped configuration defined by a lower horizontal portion 24 and a pair of vertical portions 26 extending upwardly from opposed ends of the horizontal portion 24. The lower horizontal portion 24 is positioned on a lower portion of the rear surface of the sun visor 12. The pair of vertical portions 26 each have free upper ends 28 extending over the upper edge 14 of the sun visor 12 to a position on an upper portion of the front surface. The free upper ends 28 each have a male snap fastener 30 disposed thereon. The lower horizontal portion 24 has hook and loop material 32 disposed thereon.

The extension portion 34 is pivotally coupled with respect to the bracket 22. The extension portion 34 has a generally rectangular configuration defined by an upper edge 36, a lower edge 38, opposed side edges 40, a front surface, and a back surface. The rear surface of the extension portion 34 has an upper tab 42 extending upwardly therefrom above the upper edge 36 thereof. The upper tab 42 has hook and loop material (not illustrated) disposed on an outer surface thereof for mating with the hook and loop material 32 of the lower horizontal portion 24 of the bracket 22. Note FIG. 4. The extension portion 34 can be adjusted laterally along the sun visor portion 12 simply by attaching the upper tab 42 to a position anywhere along the length of the lower horizontal portion 26 thereby effectively combating glaring sunlight. The rear surface of the extension portion 34 has a pair of lower tabs 44 extending downwardly therefrom below the lower edge 38 thereof. The pair of lower tabs 44 each have a female snap fastener 46 disposed thereon for engaging the male snap fasteners 30 of the free upper ends 28 of the vertical portions 26 of the bracket 22 in a closed orientation. Note FIG. 2. In the preferred embodiment, the extension portion 34 is less than half of an overall size of the sun visor portion 12.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An adjustable sun visor extension device for screening light from a person's eyes while in a vehicle and adjusting to their specific need comprising, in combination:

a sun visor portion having a generally rectangular configuration, the sun visor portion being defined by an upper edge, a lower edge, a pair of opposed side edges, a front surface, and a rear surface, one of the opposed side edges having a pivot rod extending outwardly of an upper end thereof for pivotally coupling with an interior of a vehicle above a windshield thereof;

a bracket secured to the rear surface of the sun visor portion, the bracket having a generally U-shaped configuration defined by a lower horizontal portion and a pair of vertical portions extending upwardly from opposed ends of the horizontal portion, the lower horizontal portion being positioned on a lower portion of the rear surface of the sun visor, the pair of vertical portions each having free upper ends extending over the upper edge of the sun visor to a position on an upper portion of the front surface, the free upper ends each having a male snap fastener disposed thereon, the lower horizontal portion having hook and loop material disposed thereon;

an extension portion pivotally coupled with respect to the bracket, the extension portion having a generally rectangular configuration defined by an upper edge, a lower edge, opposed side edges, a front surface, and a back surface, the rear surface of the extension portion having an upper tab extending upwardly therefrom above the upper edge thereof, the upper tab having hook and loop material disposed on an outer surface thereof for mating with the hook and loop material of the lower horizontal portion of the bracket, the rear surface of the extension portion having a pair of lower tabs extending downwardly therefrom below the lower edge thereof, the pair of lower tabs each having a female snap fastener disposed thereon for engaging the male snap fasteners of the free upper ends of the vertical portions of the bracket in a closed orientation.

2. An adjustable sun visor extension device for screening light from a person's eyes while in a vehicle and adjusting to their specific need comprising, in combination:

a bracket securable to a rear surface of a sun visor, the bracket having a generally U-shaped configuration defined by a lower horizontal portion and a pair of vertical portions extending upwardly from opposed ends of the horizontal portion, the lower horizontal portion being positionable on a lower portion of the rear surface of the sun visor, the pair of vertical portions each having free upper ends extending over an upper edge of the sun visor to a position on an upper portion of a front surface of the sun visor;

an extension portion pivotally coupled with respect to the bracket, the extension portion having a generally rectangular configuration defined by an upper edge, a lower edge, opposed side edges, a front surface, and a back surface, the rear surface of the extension portion having an upper tab extending upwardly therefrom above the upper edge thereof, the upper tab removably coupling with the lower horizontal portion of the bracket, the rear surface of the extension portion having a pair of lower tabs extending downwardly therefrom below the lower edge thereof, the pair of lower tabs each removably engaging the free upper ends of the vertical portions of the bracket in a closed orientation.

3. The adjustable sun visor extension device as set forth in claim 2 wherein the upper tab has hook and loop material disposed on an outer surface thereof for mating with hook and loop material on the lower horizontal portion of the bracket.

4. The adjustable sun visor extension device as set forth in claim 2 wherein the pair of lower tabs each have a female snap fastener disposed thereon for engaging male snap fasteners on the free upper ends of the vertical portions of the bracket.

* * * * *